(12) United States Patent
Duty et al.

(10) Patent No.: US 6,830,039 B2
(45) Date of Patent: Dec. 14, 2004

(54) SYSTEM AND METHOD FOR DETERMINING PURGE VALVE FLOW TOLERANCE

(75) Inventors: Mark J Duty, Goodrich, MI (US); Gregory T Weber, Commerce Twp., MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 63 days.

(21) Appl. No.: 10/342,981

(22) Filed: Jan. 15, 2003

(65) Prior Publication Data

US 2004/0134472 A1 Jul. 15, 2004

(51) Int. Cl.$^7$ .............................................. F02M 33/02
(52) U.S. Cl. ...................................................... 123/520
(58) Field of Search ............................. 123/520, 198 D, 123/406.18, 406.62; 60/283, 285; 701/102, 107

(56) References Cited

U.S. PATENT DOCUMENTS

| | | | |
|---|---|---|---|
| 5,209,202 A | * 5/1993 | Maurer et al. | 123/406.18 |
| 5,269,274 A | * 12/1993 | Flaetgen et al. | 123/406.62 |
| 5,469,823 A | * 11/1995 | Ott et al. | 123/406.62 |
| 5,529,047 A | * 6/1996 | Aota et al. | 123/674 |
| 6,102,364 A | * 8/2000 | Busato | 251/129.05 |
| 6,253,750 B1 | 7/2001 | Duty et al. | |
| 6,722,347 B2 | * 4/2004 | Sanchez et al. | 123/520 |

* cited by examiner

Primary Examiner—Mahmoud Gimie
(74) Attorney, Agent, or Firm—Edwin W. Bacon, Jr.

(57) ABSTRACT

An arrangement for determining purge valve flow tolerance for use with evaporative emissions control systems includes developing an equation based on data relating purge valve duty cycle to flow, wherein the equation describes a flow curve with reference to a first axis and a second axis. The arrangement further includes using the equation as a base equation for flow, and adapting the equation for part-to-part tolerance as a function of an intercept point of the equation with respect to the first axis, wherein the first axis relates to duty cycle.

22 Claims, 3 Drawing Sheets

SYSTEM AND METHOD FOR DETERMINING PURGE VALVE FLOW TOLERANCE

FIELD OF THE INVENTION

The present invention generally relates to systems and methods of purge valve flow control for use with evaporative emissions control systems, and particularly relates to systems and methods for determining purge valve flow tolerance.

BACKGROUND OF THE INVENTION

Variable flow rate purge valves used in evaporative emissions control systems suffer from problems relating to part-to-part tolerance. For example, flow rate at low duty cycle can vary from part-to-part by as much as three-hundred percent, resulting in serious drivability issues at low engine speeds, especially with smaller displacement engines. As a result, past evaporative emissions control systems have not been able to utilize less expensive purge valves with less demanding part-to-part tolerance. As a further result, other solutions have focused on utilizing constant flow rate purge valves to avoid the tolerance issue.

What is needed is a solution that allows evaporative emissions control systems to utilize less expensive purge valves with less demanding part-to-part tolerance. Thus, the need remains for an adaptive system and method of purge valve control that is capable of determining purge valve tolerance and operating accordingly. The present invention fulfills this need.

SUMMARY OF THE INVENTION

In one aspect of the invention, a method for determining purge valve flow tolerance for use with evaporative emissions control systems includes developing an equation based on data relating purge valve duty cycle to flow, wherein the equation describes a flow curve with reference to a first axis and a second axis. The method further includes using the equation as a base equation for flow, and adapting the equation for part-to-part tolerance as a function of an intercept point of the equation with respect to the first axis, wherein the first axis relates to duty cycle.

In another aspect of the invention, a purge valve flow tolerance determination system for use with evaporative emissions control systems includes a memory storing an equation based on data relating purge valve duty cycle to flow, wherein the equation describes a flow curve with reference to a first axis and a second axis. A purge valve operation module is adapted to operate a purge valve based on the equation. An adaptation module adapts the equation for part-to-part tolerance as a function of an intercept point of the equation with respect to the first axis, wherein the first axis relates to duty cycle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
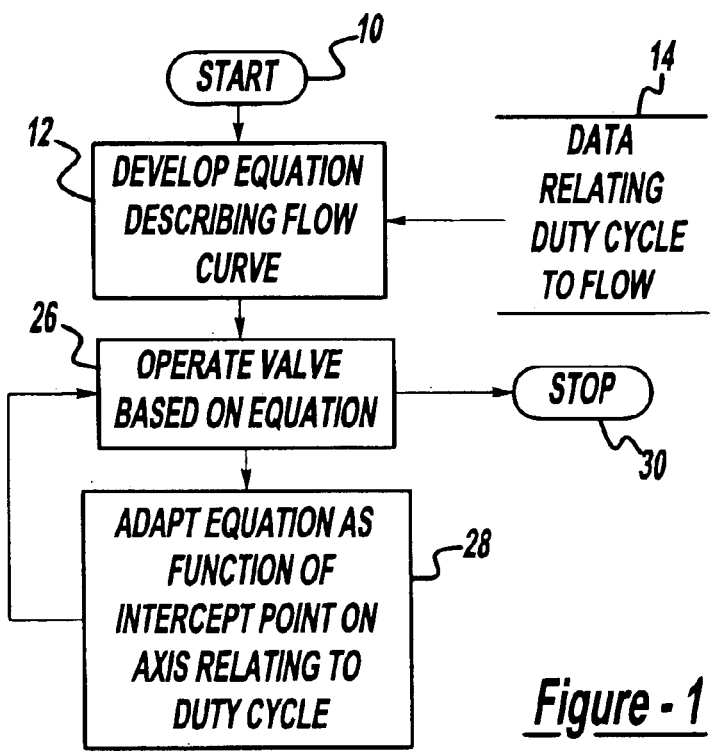
FIG. 1 is a flow diagram depicting the general method of determining purge valve flow tolerance according to the present invention.
Figure 2:
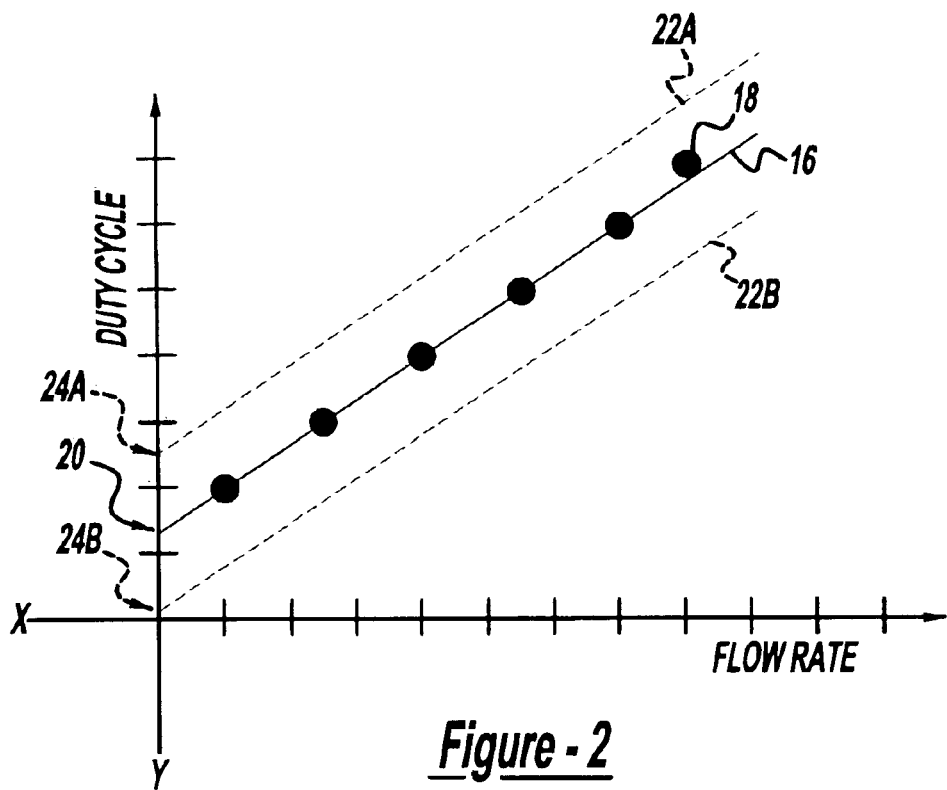
FIG. 2 is a graph depicting a purge flow curve according to the present invention.

The general method of the present invention is illustrated in FIG. 1. Beginning at 10, the method includes developing an equation describing a flow curve at step 12 based on data 14 relating duty cycle to flow. For example, preexisting data 14, such as provided by an existing lookup table, can be fitted into a point slope equation to determine a slope. Exemplary lookup table data of Table 1 is plotted in FIG. 2 as an example, wherein the X-axis relates to flow rate and the Y-axis relates to duty cycle.

TABLE 1

| X | Y |
|---|---|
| 1.0 | 2.0 |
| 2.5 | 3.0 |
| 4.0 | 4.0 |
| 5.5 | 5.0 |
| 7.0 | 6.0 |
| 8.0 | 7.0 |

The data points of Table 1 are substantially linear, as is typical of purge valve behavior, so that development of a flow curve corresponding to line 16 is appropriate. The data point 18 at the higher duty cycle/flow rate end of the curve diverges slightly, as is consistent with a purge valve that has fully opened before reaching the corresponding duty cycle. Thus, it is further appropriate to discard data point 18, and develop an equation describing line 16 by fitting other data of Table 1 into a point-slope equation, $(y_2-y_1)=m(x_2-x_1)$. It follows that $(6-2)=m(7-1)$ such that $m=2/3$. It is possible to additionally determine, either by solving the point-slope equation for an x value of zero, or from y-intercept equation, $y=mx+b$, that the y-intercept at 20 is $4/3$ for the data set of Table 1. This particular y-intercept information, however, is not generally needed to develop the equation, but may be useful in some contexts relating, for example, to adaptation of an existing lookup function based on the equation.

The y-intercept equation and the known value of m suffice to describe any corresponding curve simply by determining an appropriate y-intercept as at 22A and 22B, where y-intercepts respectively correspond, for example, to 5/2 and 0 at 24A and 24B. A new data set can thus be obtained, if desired, for any y-intercept. Alternatively, a particular duty cycle for a desired flow rate can be determined for any y-intercept. Notably, only two data points are needed to develop the equation where the duty cycle to flow relationship is reliably linear. Thus, if data 14 must be collected, it is conceivable that only two measurements need be taken to provide the necessary data 14. Thus, the process of applying pulse width modulated current to a purge valve, modifying a duty cycle of the current, and measuring a plurality of rates of flow through the purge valve for a plurality of duty cycles can be simplified compared to developing a lookup table.

Returning to FIG. 1, the method includes operating the purge valve in step 26 based on the equation describing the curve. During operation at step 26, the method includes adapting the equation at step 28 as a function of an intercept point on the axis relating to duty cycle. Thus, a subroutine is invoked to determine the intercept point on the Y-axis when the valve initially opens by sensing an initial opening of the valve based on rate of flow, and by equating a duty cycle producing the initial opening with the intercept point on the Y-axis. The invoked subroutine closes the vent valve of the purge canister, drives the closed purge valve to a point of initial opening, saves the final duty cycle as the value for the Y-intercept b, opens the vent valve, and then returns control to step 26. Therein, the purge valve is opened to a desired flow rate by determining the corresponding duty cycle using the Y-intercept form of the equation adapted by incorporation of the new value for b. The method ends at 30.

Figure 3:
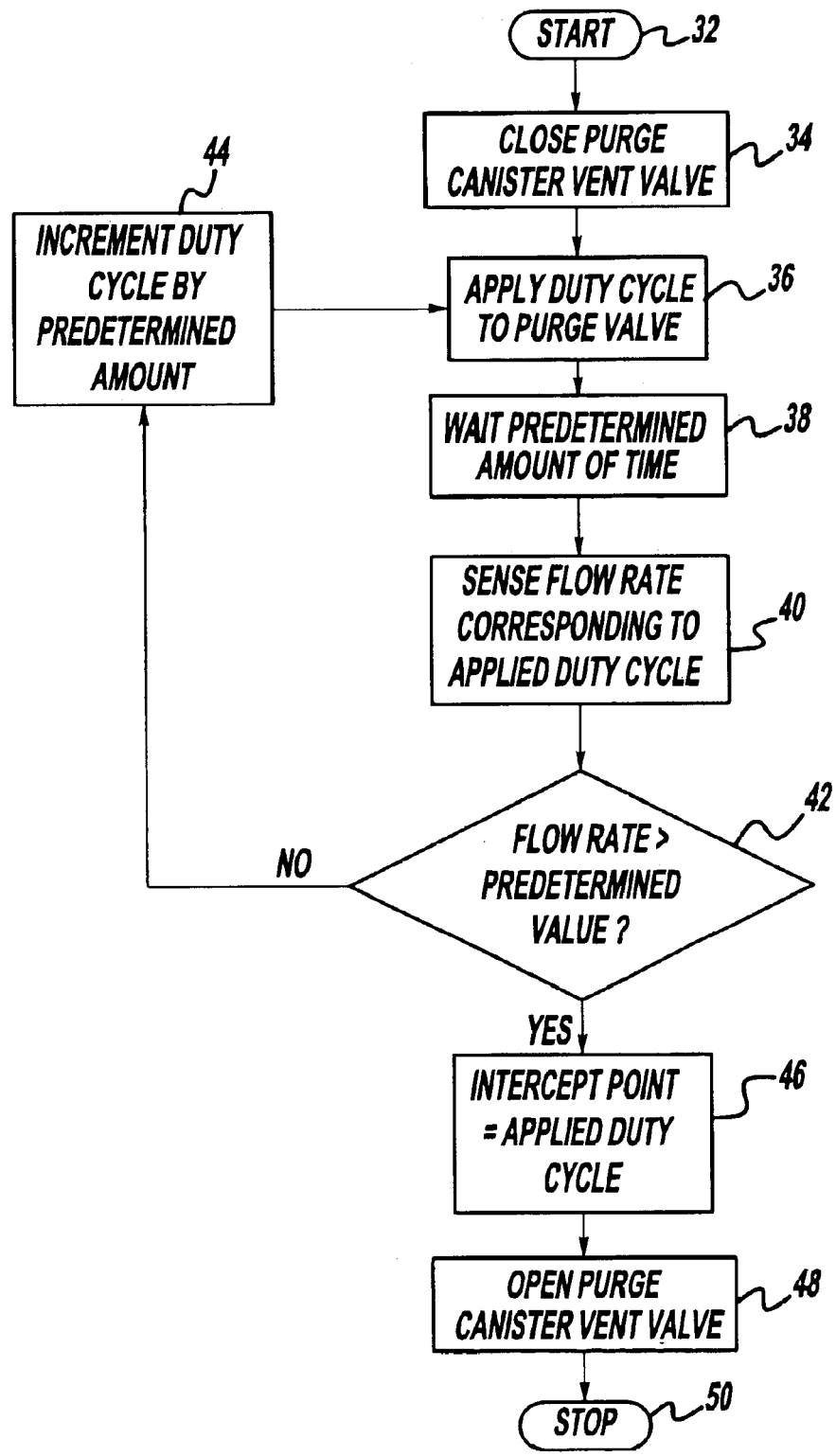
FIG. 3 is a flow diagram depicting the detailed method of determining purge valve flow tolerance according to the present invention.

Further discussion relating to methodology employed in steps 26 and 28 occurs with reference to FIG. 3, wherein the detailed method of the present invention is illustrated. This detailed method begins at 32 and proceeds with closing of the vent valve at step 34 to produce a sealed environment under pressure regulated solely by operation of the purge valve. Then, with the vent valve closed, an initial duty cycle is applied to the purge valve at step 36. The method includes waiting a predetermined amount of time at step 38 to allow the flow rate to respond to the applied duty cycle. Then, at step 40, a flow rate is sensed that results from application of the duty cycle in step 36, preferably by measuring changes in fuel vapor through O2 feedback at the exhaust. *Model Based Purge System*, U.S. Pat. No. 6,253,750, issued to Duty et al. contains details relating to measuring changes in fuel vapor through O2 feedback at the exhaust, and is incorporated by reference herein. If the fuel vapor level is not determined at 42 to be higher than a predetermined value corresponding to a minimum detectable fuel vapor level, then the duty cycle is incremented by a predetermined amount at step 44, and processing continues at step 36. If, however, the fuel vapor level is determined at 42 to be higher than the predetermined value, then the y-intercept point, b, is set equal to the duty cycle applied at step 36. The vent valve is then opened at step 48, and the detailed method ends at 50.

Figure 4:
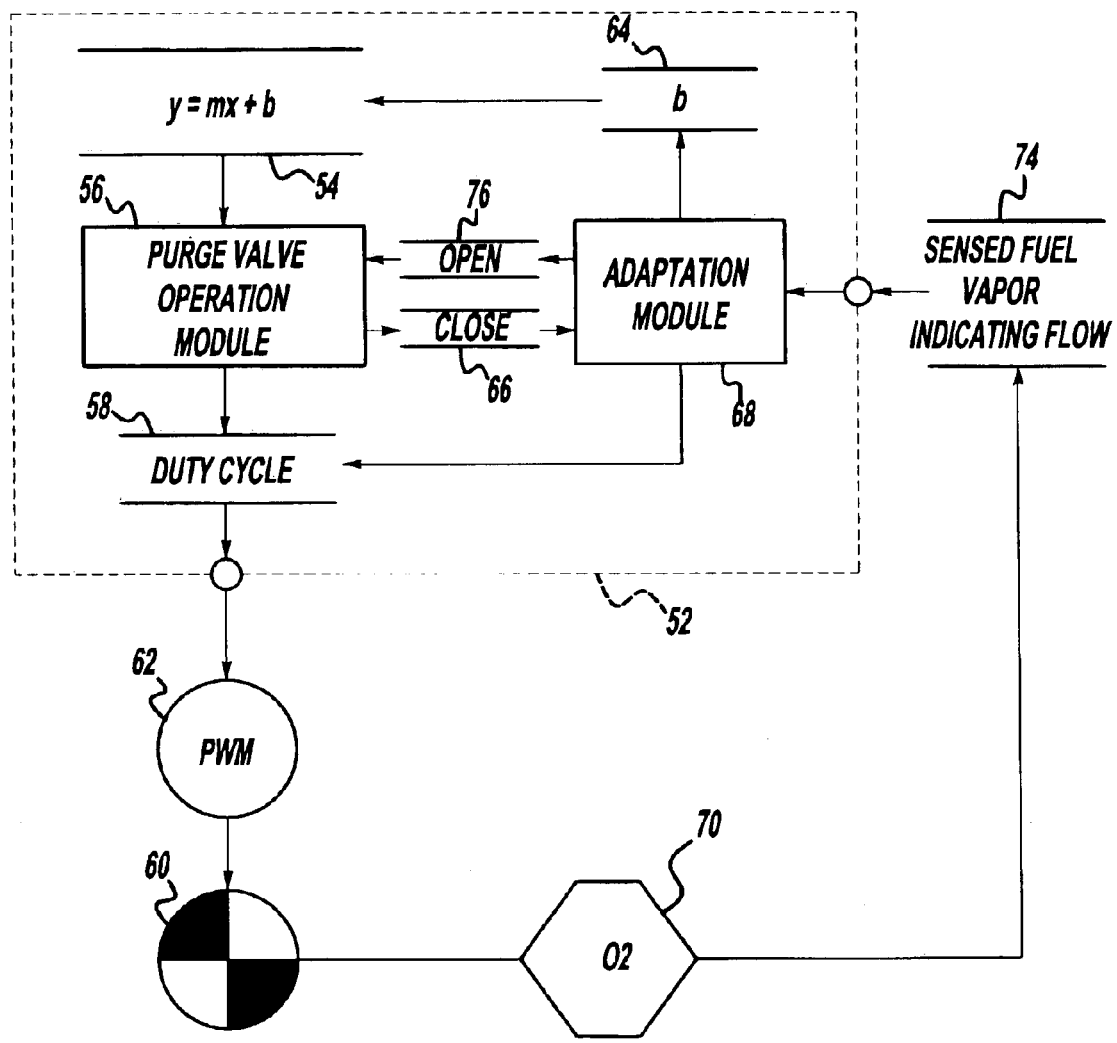
FIG. 4 is a block diagram depicting the purge valve flow tolerance system according to the present invention.

The following pseudo code serves to particularly describe the method of the present invention. Therein, PRG_DC refers to duty cycle applied to the purge valve, PRG_VLV_FRAC refers to fuel vapor level delivered to the engine by the purge valve, and PRG_ACT_FLOW_INTCPT refers to the point on the y axis relating to a duty cycle beginning to produce a detectable flow rate:

The system of the present invention is illustrated in FIG. 4. The purge valve flow tolerance system 52 has an equation 54 stored in memory that describes a flow curve for the purge valve. The slope, m, is particularly stored in memory to describe this curve, but the Y-intercept, b, is determined as needed to adjust for purge valve variability. Purge valve operation module 56 is adapted to determine a duty cycle for operating purge valve 60 via pulse wave modulated power source 62 by using equation 54, a stored value of m (not shown), and an adaptively computed value for b 64. Whenever purge valve operation module 56 needs to determine the tolerance of purge valve 60 (e.g., once per trip), it closes purge valve 60, if required, and passes operation of purge valve 60 to adaptation module 68. In turn, adaptation module 68 closes a vent valve (not shown), and drives the duty cycle 58 incrementally higher until flow detection returns a sensed fuel vapor level 74 that indicates purge valve 60 has begun to open according to adaptation module 68 being operable to detect flow through the purge valve based on detection of fuel vapor. The corresponding duty cycle is then passed to equation 54 as the new value of b 64. Adaptation module 68 then opens the vent valve as at 76 and returns operation of purge valve 60 to purge valve operation module 56.

The description of the invention is merely exemplary in nature and, thus, variations that do not depart from the gist of the invention are intended to be within the scope of the invention. For example, while variable flow rate purge valves generally produce linear flow curves, it is foreseeable that non-linear flow curves may also be developed and used in accordance with the present invention. In particular, a flow curve corresponding to a parabola, $y=x^2+x+b$, also corresponds to $y=(x+1)x+b$, so that $m=(x+1)$. Thus, a non-linear data set can be used, and existing software tools can be implemented, if necessary, to convert a set of data points into an appropriate curve. If required, the slope can be defined as a step function. Also, the system and method of the present invention can employ more than one axis if the flow rate at a particular duty cycle is additionally related, for example, to temperature. Thus, three or more axes can be used to derive an equation of three or more variables from data controlling for those variables. Further, the system and method of the present invention can still use an existing map, but adjust lookup functions based on the developed equation. In particular, the lookup method, when passed a desired flow rate, can subtract the original y-intercept from the returned duty cycle and add the new y-intercept to arrive at the appropriate value. Such variations are not to be

```
static void adapt ( ){
    close (NVLD_VENT_VALVE); //close vent valve on purge canister
    while ((PRG_VLV_FRAC < PRG_MIN_VLV_DETECT)==TRUE)
    {   //perform the following until an increase in flow rate is reliably
        //detected
        PRG_DC = (PRG_DC + PRG_FLOW_INC_AMT); //increment duty
                                             //cycle
        sleep(PRG_FLOW_INC_TIME); //wait for flow rate to respond to
                                  //new duty cycle
        update(PRG_VLV_FRAC)//use O2 feedback to measure flow
        if ((PRG_VLV_FRAC > PRG_MIN_VLV_FRAC_DETECT)==TRUE)
        {   //if an increase in flow rate is reliably detected
            PRG_ACT_FLOW_INTCPT = PRG_DC; //save duty cycle as
                                          //y-intercept
        }
        else{}
    }
    open (NVLD_VENT_VALVE); //open vent valve on purge canister
}
``` regarded as a departure from the spirit and scope of the invention.

What is claimed is:

1. A method for determining purge valve flow tolerance for use with evaporative emissions control systems, comprising:

developing an equation based on data relating purge valve duty cycle to rate of flow, wherein the equation describes a flow curve with reference to a first axis and a second axis;

using the equation as a base equation for rate of flow;

applying a pulse width modulated current to the purge valve;

measuring O2 feedback to determine a rate of flow through the purge valve for a duty cycle of the pulse width modulated current;

determining whether the purge valve is open or closed based on the measured O2 feedback, and adapting the equation for part-to-part tolerance as a function of an intercept point of the equation with respect to the first axis, wherein the first axis relates to duty cycle.

2. The method of claim 1, further comprising collecting the data relating purge valve duty cycle to rate of flow.

3. The method of claim 2, wherein said step of collecting the data comprises:

applying pulse width modulated current to a purge valve;

modifying a duty cycle of the current; and measuring a plurality of rates of flow through the purge valve for a plurality of duty cycles.

4. The method of claim 3, wherein said step of measuring a plurality of rates of flow through the purge valve for a plurality of duty cycles comprises measuring exactly two rates of flow for exactly two duty cycles.

5. The method of claim 1, wherein said step of developing an equation comprises fitting the data relating purge valve duty cycle to rate of flow into a point slope equation.

6. The method of claim 5, wherein said step of using the equation as the base equation for rate of flow comprises using a y-intercept form of the point slope equation as the base equation for rate of flow.

7. The method of claim 1, wherein said step of determining whether the purge valve is open or closed comprises determining that the purge valve is open, and said step of adapting the equation for part-to-part tolerance comprises establishing the intercept point based on the duty cycle.

8. The method of claim 1, wherein said step of determining whether the purge valve is open or closed comprises determining that the purge valve is closed, and said step of adapting the equation for part-to-part tolerance comprises increasing the duty cycle of the pulse width modulated current by a predetermined amount.

9. The method of claim 1, wherein said step of determining whether the purge valve is open or closed comprises waiting a predetermined amount of time.

10. The method of claim 1, wherein said step of determining whether the purge valve is open or closed comprises determining whether the rate of flow exceeds a minimum detectable rate of flow.

11. The method of claim 1, wherein said step of adapting the equation for part-to-part tolerance further comprises closing a vent valve to produce a sealed environment under pressure substantially regulated by operation of the purge valve.

12. The method of claim 11, wherein said step of determining whether the purge valve is open or closed includes determining that the purge valve is open, and wherein said step of adapting the equation for part-to-part tolerance further comprises opening the vent valve.

13. A purge valve flow tolerance determination system for use with evaporative emissions control systems, comprising:

a memory storing an equation based on data relating purge valve duty cycle to rate of flow, wherein the equation describes a flow curve with reference to a first axis and a second axis;

a purge valve operation module adapted to operate a purge valve based on the equation; and an adaptation module using an O2 sensor for determining rate of flow through the purge valve and using the determined rate of flow to adapt the equation for part-to-part tolerance as a function of an intercept paint of the equation with respect to the first axis, wherein the first axis relates to duty cycle.

14. The system of claim 13, further comprising a power source applying pulse width modulated current to the purge valve.

15. The system of claim 13, wherein said adaptation module is adapted to adjust duty cycle of the pulse width modulated current while sensing rate of flow through the purge valve, and to determine whether the purge valve is open or closed based on the rate of flow.

16. The system of claim 15, wherein said adaptation module is adapted to establish the intercept point based on a particular duty cycle causing the purge valve to begin to open.

17. The system of claim 16, wherein said adaptation module is adapted to recursively increase the duty cycle of the pulse width modulated current by a predetermined amount, wait a predetermined amount of time, and determine whether the rate of flow exceeds a minimum detectable rate of flow.

18. The system of claim 13, wherein said equation describes a curve having a slope formed by fitting the data into a point-slope equation.

19. The system of claim 18, wherein said purge valve operation module is adapted to determine a particular duty cycle y for a desired purge valve behavior x according to:

$$y=mx+b$$

wherein a y axis relates to duty cycle, on x axis relates to rate of flow, m relates to the slope, and b relates to an intercept point on the y axis.

20. The system of claim 18, wherein said adaptation module is operable to determine the intercept point on the y axis at a time the purge valve initially opens by sensing an initial opening or the purge valve based on rate of flow, and by equating a duty cycle producing the initial opening with the intercept point on the y axis.

21. The system of claim 13, wherein said adaptation module is operable to close a vent valve, thereby producing a sealed environment under pressure substantially regulated by operation of the purge valve.

22. The method of claim 21, wherein said adaptation module is operable to open the vent valve once adaptation of the equation has been substantially completed.

* * * * *